United States Patent
Petsche et al.

(10) Patent No.: US 8,052,394 B2
(45) Date of Patent: Nov. 8, 2011

(54) ROTOR BLADE OF A WIND ENERGY UNIT

(75) Inventors: Marc Petsche, Nubbel (DE); Urs Bendel, Fockbek (DE)

(73) Assignee: Repower Systems AG, Hamburg (DE)

( * ) Notice: Subject to any disclaimer, the term of this patent is extended or adjusted under 35 U.S.C. 154(b) by 587 days.

(21) Appl. No.: 12/296,745

(22) PCT Filed: Mar. 28, 2007

(86) PCT No.: PCT/EP2007/002735
§ 371 (c)(1),
(2), (4) Date: Oct. 10, 2008

(87) PCT Pub. No.: WO2007/118581
PCT Pub. Date: Oct. 25, 2007

(65) Prior Publication Data
US 2009/0274559 A1   Nov. 5, 2009

(30) Foreign Application Priority Data

Apr. 13, 2006   (DE) .......................... 10 2006 017 897

(51) Int. Cl.
*F04D 29/38* (2006.01)
*B64C 11/16* (2006.01)
*F01D 5/14* (2006.01)
(52) U.S. Cl. ..... 416/235; 416/62; 416/223 R; 29/889.71
(58) Field of Classification Search ................ 29/223 R, 29/235, DIG. 2, 62, 889.71
See application file for complete search history.

(56) References Cited

U.S. PATENT DOCUMENTS
2007/0025858 A1   2/2007   Driver et al.
(Continued)

FOREIGN PATENT DOCUMENTS
DE   19815519 A1   10/1999
(Continued)

OTHER PUBLICATIONS

Hau, Erich; "Windkraftanlagen"; Third Edition, 2003; Springer-Verlag Berlin/Heidelberg/New York; (pp. 90-91).
(Continued)

*Primary Examiner* — Michelle Estrada
(74) *Attorney, Agent, or Firm* — Rankin, Hill & Clark LLP

(57) ABSTRACT

The invention relates to a rotor blade (60) of a wind energy plant with a top side (suction side) and a bottom side (pressure side) wherein profiles (21, 22, 23, 24, 25) with a front edge and a back edge (62) in cross-section are designed along a longitudinal axis between a rotor blade root and a rotor blade tip, one designed-based direction of air inflow (31, 32, 33, 34, 35) is predetermined for each profile (21, 22, 23, 24, 25) and the profiles (21, 22, 23, 24, 25) in the outer area facing the rotor blade tip are designed with a relative thickness of less than 30%. The rotor blade (60) is characterized in that an attached device (51), which has an attached-device inflow surface as well as a start point (41, 42, 43) facing the front edge of the attached-device inflow surface (52) and an end point facing the back edge (62) of the attached-device inflow surface (52), is arranged along the longitudinal axis in the inner area dedicated to the rotor blade root to profiles (21, 22, 23, 24, 25) with a relative thickness of more than 30% on the pressure side.

14 Claims, 6 Drawing Sheets

U.S. PATENT DOCUMENTS

2008/0187442 A1* 8/2008 Standish et al. ............. 416/235

FOREIGN PATENT DOCUMENTS

| DE | 102004007487 A1 | 9/2005 |
|---|---|---|
| DK | 9500009 U3 | 4/1996 |
| EP | 1112928 A2 | 7/2001 |
| WO | 02/08600 A1 | 1/2002 |
| WO | 02/38442 A2 | 5/2002 |
| WO | 2004/097215 A1 | 11/2004 |
| WO | 2004/099608 A1 | 11/2004 |
| WO | 2007/115861 A1 | 10/2007 |

OTHER PUBLICATIONS

Heier, Siegfried; "Windkraftanlagen"; Third Edition, 2003; B.G. Teubner GmbH, Stuttgart/Leipzip/Wiesbaden; (pp. 41, 50-60).

Fuglsang, Peter et al.; "Design And Verification of the Ris0-B1 Airfoil Family for Wind Turbines, Transactions of the ASME"; 2004 (p. 1-11).

Extract From the European Patent Register Concerning WO 2007/115861.

Anderson, John D. "Fundamentals of Aerodynamics"; Second Edition; 1991; McGraw-Hill, Inc., New York; (pp. 228-236).

Fuglsang et al.; "Development of the Riso Wind Turbine Airfoils"; Wind Energy; Wiley; Chichester, Great Britain; vol. 7, No. 2; May 24, 2004; pp. 145-162; XP002436915.

Jackson, K.J. et al.; "Innovative Design Approaches for Large Wind Turbine Blades"; Wind Energy; Wiley; vol. 8, No. 2; Apr. 2005; pp. 141-171; XP002440739.

Timmer, W.A. et al.; "Summary of the Delft University Wind Turbine Dedicated Airfoils"; Delft University of Technology; Delft, The Netherlands; AIAA, Inc. and ASME; 2003; pp. 11-21.

* cited by examiner

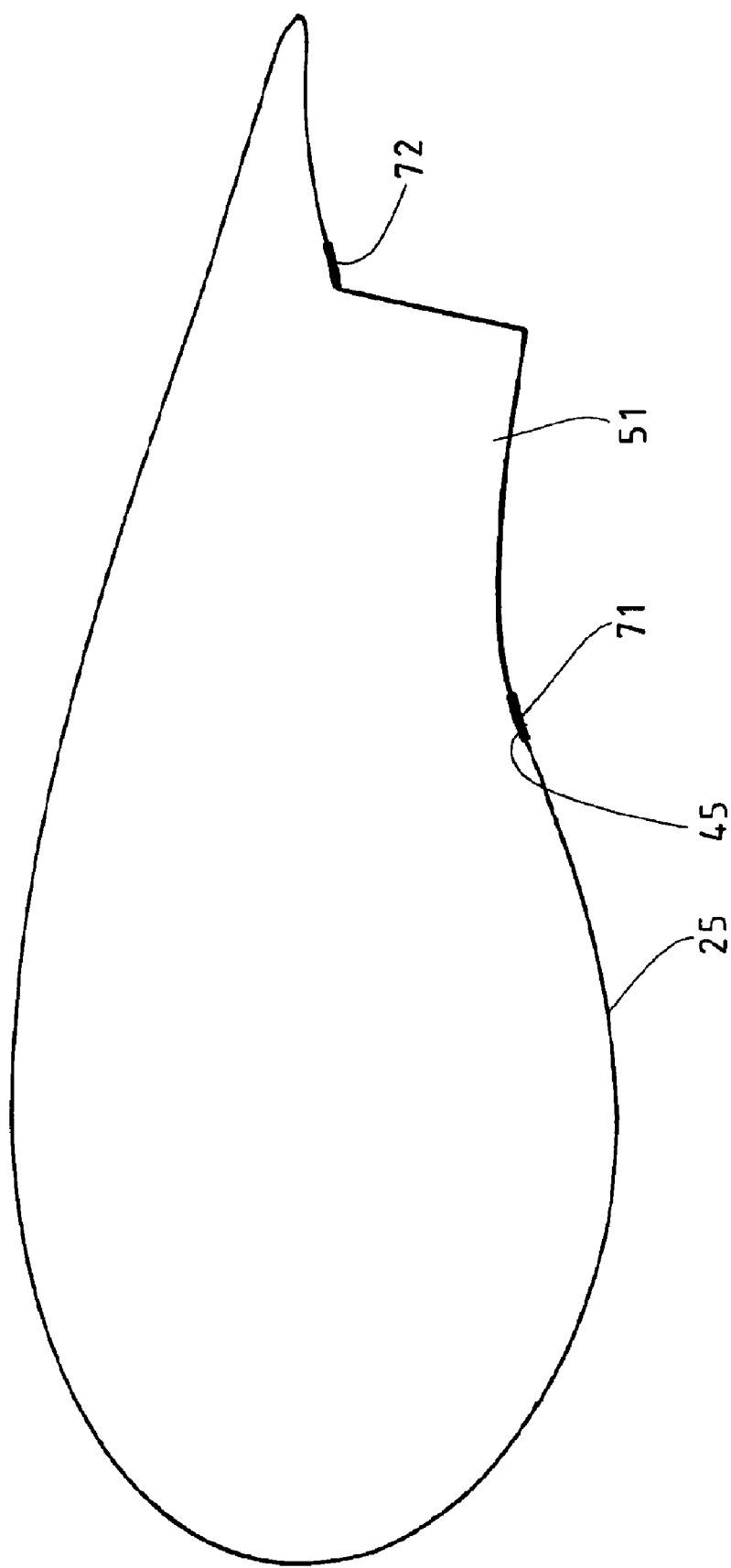

ROTOR BLADE OF A WIND ENERGY UNIT

The invention relates to a rotor blade of a wind energy plant with a top side (suction side) and a bottom side (pressure side) wherein profiles with a front edge and a back edge in cross-section are designed along a longitudinal axis between a rotor blade root and a rotor blade tip, one designed-based direction of air inflow is predetermined for each profile and the profiles in the outer area facing the rotor blade tip are designed with a relative thickness of less than 30%. Moreover, the invention relates to a wind energy plant and the use of an attached device. Moreover, the invention relates to a method for the production of a rotor blade of a wind energy plant.

The efficiency of rotor blades of a wind energy plant is determined by the angle of incidence, i.e. the angle between the rotor blade profile chord and the air inflow direction. In wind energy plants, the angle of incidence in particular depends on the rotor blade speed and thus on the rotor speed and the wind speed.

So that the lift can fully unfold during an aerodynamic lift of a rotor blade, the flow of the wind must be lie on the profile of the rotor blade for a long as possible. The rotor blade should always be flowed against at an advantageous angle. The size and the angle of the upwind speed hereby change depending on the wind speed and the velocity in the respective point of a rotor blade. Due to the fact that the circumferential speed is greatest at the rotor blade tip and decreases to the rotor hub, the result is an increase in the angle of incidence relative to the rotor plane from the blade peak in the direction of the hub. In order to ensure that the rotor blade is flowed against optimally at each point, the rotor blades are designed with a twist.

Rotor blades of a wind energy plant are described in DE-A-198 15 519 and DE-A-10 2004 007 487. Another rotor blade of a wind turbine is disclosed in WO-A-2002/008600.

Starting from this state of the art, the object of this present invention is to provide a rotor blade of a wind energy plant and to improve the operation of a wind energy plant, whereby the energy yield of a wind energy plant is optimized or increased with the use of this type of rotor blade.

This object is solved with a rotor blade of the initially named type such that an attached device is arranged along the longitudinal axis in the area in the inner area assigned to the rotor blade root to profiles with a relative thickness of more than 30% on the pressure side, which has an attached-device inflow surface as well as a start point facing the front edge of the attached-device inflow surface and an end point facing the back edge of the attached-device inflow surface, whereby the start point of the attached-device inflow surface is arranged in the area between the front edge and the back edge of the profile so that the tangent to the profile in the start point in an angle range between +20° and −20°, in particular between +15° and −15°, is designed in the designed-based direction of air inflow of the profile.

The invention is based on the idea that a rotor blade profile in the inner area, i.e. with a greater relative thickness of more than 30%, in particular more than 50% relative thickness, receives an optimized aerodynamic design through an additionally designed inflow surface or attached-device inflow surface through the attached device on the pressure side of the rotor blade. Through the additionally designed inflow surface area, which is applied for example retroactively after completion of a complete rotor blade to a preferred location in the inner area of the rotor blade, a type of curvature increase on the preferred profiles of the rotor blade leads to a lift increase.

The relative thickness of a rotor blade profile is generally understood as the ratio of the (largest) profile thickness to the chord length of the profile.

In the case of thicker profiles, in which the flow of the wind on the pressure side in the area near the rotor hub threatens to be displaced, the start points of the attached device are arranged in an area of the profile contour, in which the contact ends or the tangents in the respective start point lie or are designed almost parallel to the air inflow direction or to the (predetermined) designed-based direction of air inflow. The start points of the attached device according to the invention on the pressure side of the rotor blade profile in the inner area are thereby determined or characterized by relative profile thicknesses of more than 30%, preferably more than 50%. A tolerance of approx. ±20° between the contact ends in the start point to the profile and the designed-based direction of air inflow is hereby advantageous or possible. The profiles are typically present in the inner area with a relative thickness of more than 50%.

In accordance with the invention, the rotor blade profiles (as primary profiles) have in the inner area, which is very complicated to construct and manufacture, a type of secondary profile with the designed or arranged attached-device inflow surface of the attached device so that the increase in the inflow angle in the area near the rotor hub is taken into consideration by the additionally designed inflow surface and the energy yield is thus increased.

An applied flow of the medium or wind continues to be provided during the transition between the pressure-side flow area of the rotor blade and the connecting inflow surface of the attached device.

With the attached device according to the invention, the aerodynamic profile properties of a rotor blade are improved with respect to an improved energy yield (on annual average). In accordance with the invention, the profile lift of inner profile sections is effectively increased for relative profile thicknesses of 100% to 30%. Due to the fact that the attached device is arranged in front of the break-off point of the flow on the profile with respect to the front edge of the profile, the output of a rotor increases on annual average by up to 3.0%.

The object is also solved or a preferred embodiment of the rotor blade is created in that an attached device, which has an attached-device inflow surface and a start point facing the front edge of the attached-device inflow surface and an end point facing the back edge, is arranged along the longitudinal axis in the inner area assigned to the rotor blade root to profiles with a relative thickness of more than 30% on the pressure side, wherein the start point of the attached-device inflow surface is designed in front of the break-off point of the wind flow on the pressure side or in front of the break-off point of the medium flowing by the rotor blade on the pressure side. This avoids an airflow disruption in the area near the center of the rotor blade on the pressure side or at least pushes it downstream.

In accordance with the invention, a so-called designed-based direction of air inflow is present at a predetermined designed-based tip speed ratio, which is designed differently for each cross-sectional profile of the rotor blade. The tip speed ratio X of a rotor blade or a wind energy plant is an important indicator for the design of wind energy plants. It specifies the ratio of the circumferential speed of the rotor (blade tip speed) to the wind speed. The tip speed ratio specifies how fast the blades move in relation to the wind.

As a general rule, the tip speed ratios change during the operation of a wind energy plant as a result of the wind speed and the rotor speed. In the case of the designed-based tip speed ratio, the rotor of a wind energy plant reaches its maximum power coefficient (fixed rotor characteristic value). A corresponding predetermined designed-based direction of air inflow is thus available for each profile for a corresponding designed-based tip speed ratio of a rotor blade.

In a preferred further embodiment of a rotor blade, it is suggested that the tip speed ratio of the rotor blade lies between 7 and 11.

Moreover, it is also advantageous if the profiles in the inner area have a relative thickness of more than 50%.

Moreover, the profiles are characterized in that the tangent in the start point of the attached-device inflow surface is designed mainly parallel to the designed-based direction of air inflow.

It is also favorable if the end point of the attached-device inflow surface related to the air inflow direction ends before the back edge of the rotor blade.

Furthermore, in particular the start points of the attached-device inflow surface or the attached device are continuously connected from the inside to the outside, i.e. along the longitudinal axis. Furthermore, the end points of the attached device are continuously connected from inside to outside so that the attached device is designed as a type of component or body.

A curved spacious structure of the attached device results when the distances between the end points or the break-off points of the attached-device inflow surface (or the attached device) and the front edge of the rotor blade increases along the longitudinal axis from the inside to the outside at least in a longitudinal axis section. A type of curved attached device or a type of spoiler device with an inwardly returning, i.e. curved towards the back edge, construction, wherein the curvature designed to the inside towards the back edge of the attached device results through the twist of the air inflow direction.

For this, it is also provided that the attached device is designed like a spoiler with an air guiding surface in the form of the attached-device inflow surface, whereby the energy efficiency of the rotor blade in the inner area is increased.

Furthermore, it is advantageous if the attached device will be or is glued onto the rotor blade. The attached device can hereby be arranged retroactively after production of the rotor blade in the inner area on the pressure side. Correspondingly, the attached device in particular is retrofittable or retrofitted. In practice, this advantageously results in the fact that no or no significant increase in the system load takes place in comparison with the load assumptions of the design method.

In a preferred embodiment, it is also possible that the attached device will be or is brought from an idle position to a working position. For example, the inflow surface of the attached device can hereby be set accordingly or be retracted during corresponding wind load, whereby the attached-device inflow surface of the attached device lies close to the conventional profile of the rotor blade.

Moreover, it is preferred in a further embodiment if the end point of the attached-device inflow surface is designed as a flow break-off point on the pressure side of the profile.

Furthermore, the object is solved through a wind energy plant, which is equipped with at least one rotor blade, as described above.

The object is also solved through the use of an attached device, which will be or is arranged in an inner area of a rotor blade described above according to the invention.

Moreover, the object is solved through a method for the production of a rotor blade of a wind energy plant, wherein an attached device is arranged in the inner area of a rotor blade so that the rotor blade is designed in one embodiment in accordance with the aforementioned options. In order to avoid repetitions, we expressly refer to the above embodiments for the rotor blade described above.

The invention is described below using exemplary embodiments, wherein we expressly refer to the drawings with regard to the disclosure of all details according to the invention that are not explained in greater detail in the text.

FIG. 4a through 4d each show profile sections of a rotor blade according to the invention and FIG. 5 shows a profile section of another rotor blade according to the invention.

In the following figures, the same or similar types of elements or corresponding parts are provided with the same reference numbers in order to prevent the item from needing to be reintroduced.

Figure 1:
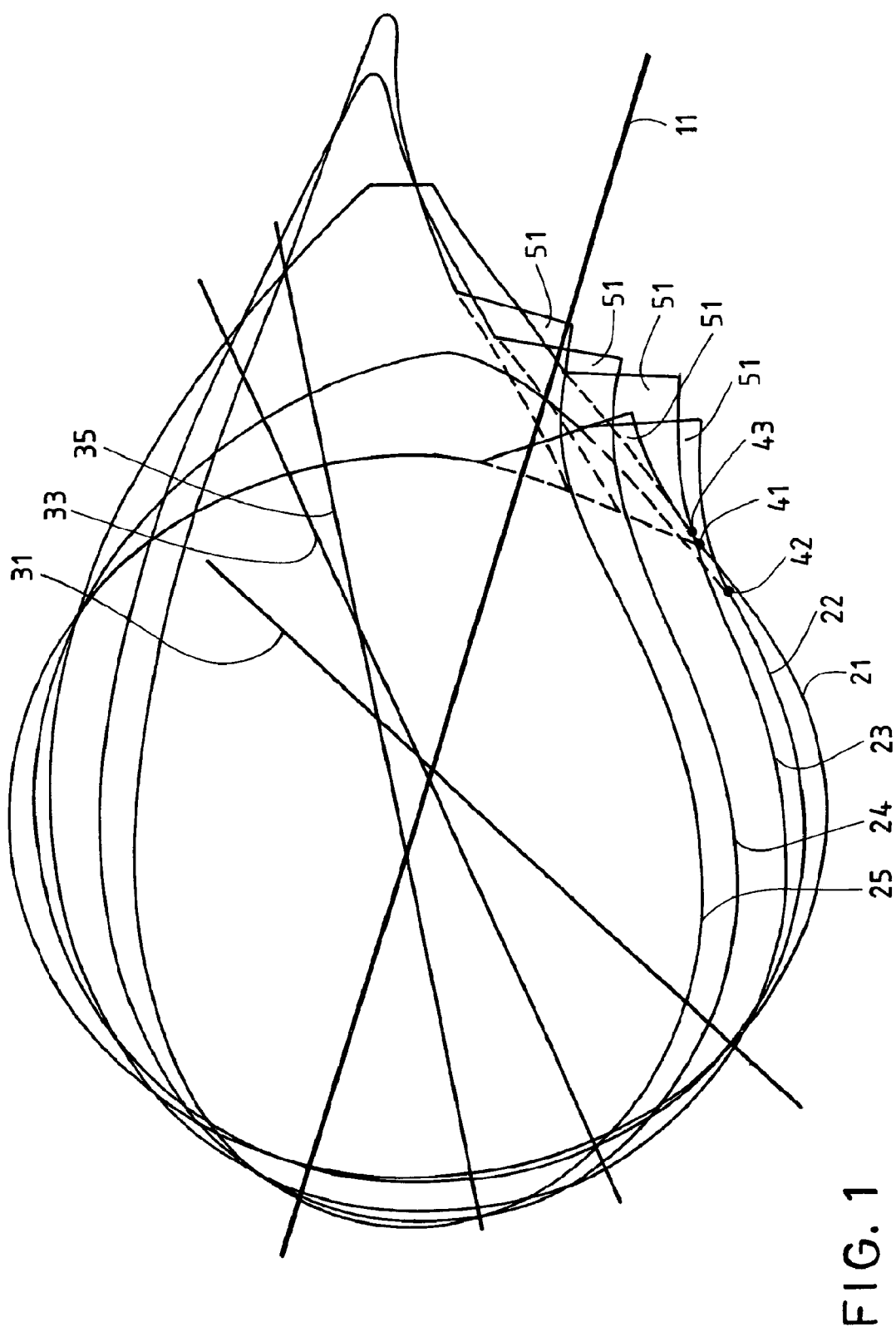
FIG. 1 shows overlapping profile sections of a rotor blade according to the invention.

FIG. 1 shows several overlapping profile sections 21, 22, 23, 24, 25 of a rotor blade 60 (see FIG. 3) from the rotor blade root in the inner area to the outer area. In this example, the innermost profile 21 has the greatest relative thickness. The profile 25 is the thinnest profile in the inner area with a relative thickness of 45%. The overlapping profile sections 21, 22, 23, 24, 25 render a profile progression of a rotor blade in different sections. For the sake of clarity, profiles with a relative thickness of less than 30% in the outer area are not shown.

Moreover, the rotor plane is drawn in a predetermined operating position of the rotor blade in FIG. 1 with the reference number 11. The different profile sections 21, 22, 23, 24, 25 are strung along a string axis from the rotor blade root to the outside to the rotor blade tip.

It follows from FIG. 1 that the relative thickness of the profile section 21 through 25 decreases from the inside (profile 21) to the outside (profile 25). This means that profile 21 in the inner area is arranged closer to the rotor blade root than the subsequent profile sections 22 through 25.

According to the (inner) profile section 21, the associated predetermined designed-based direction of air inflow 31 is drawn in FIG. 1. Moreover, the respective corresponding designed-based directions of air inflow 33, 35 are drawn for profiles 23, 25. Moreover, the start points 41, 42, 43 of an attached-device body 51 according to the invention are shown as an attached device on the pressure side of profiles 21 through 25 in cross-section in FIG. 1 for each of profile sections 21, 22, 23.

In FIG. 1, the cross-sections of the attached-device body 51 are drawn on the respective profile sections 21 through 25, wherein the cross-section of the attached-device body 51 is designed on the profile sections 21 through 25 depending on the type of triangle or suchlike or almost like a triangle.

The corresponding start point 41 through 43 of the attached-device body 51 on the respective profiles 21 through 23 is for example determined in that the respective profile is designed parallel or with a slight slope of ±20°, in particular ±15°, to the respective designed-based direction of air inflow 31, 33 and 35 of the associated profile section 21, 23 and 25. The start point 41 through 43 is hereby arranged on profile 21 through 24 in front of the respective pressure-side flow break-off point of the corresponding profile 21 through 23.

Through the retroactively applied or retrofittable attached-device body 51, the profile properties of the rotor blade 60 in the inner area, i.e. in the area with a profile thickness of more than 30%, in particular 50%, are improved, since a curvature increase on the pressure side of the rotor blade 60 is designed with the attached-device body 51. Before the flow on the pressure side of the profile 21 through 23 is displaced, an attached-device inflow surface (see FIG. 3, reference number 52) of the attached device or the attached-device body 51 is formed through the attached device 51 on the pressure side, whereby the profile lift of the rotor blade in the inner area and thus the energy yield are improved. A somewhat larger profile resistance through an increased dead water area is hereby accepted or tolerated.

It also comes from profile sections 21 through 25 that the position of the attached-device body 51 with its corresponding start points 41 through 43 are different or change from profile to profile so that at first in the inner profile section 21 for the next closest profile section 22 the start point 41 in the projection lies along the string axis behind the start point 42 of the subsequent outer profile section 22.

With an increasing rotor blade radius, the start points 43 and the other start points, which are not indicated for clarity's sake, are located increasingly further away from the front profile edge. This means that the distance between the start points 42, 43 and the start points lying further outside and the front edge of the corresponding profile increases.

Moreover, the angle position of the start points 41, 42, 43 increases with an increasing rotor radius, wherein the angle positions with respect to the rotor blade plane are measured around the rotor blade longitudinal axis.

The length of the attached device 51 along the string axis or another predetermined axis is determined depending on the length of the rotor blade. Depending on the thinness of the rotor blade, the length of the attached device can be approx. 15% to 25% of the rotor blade length. This means that, in the case of a wind energy plant with an output of 1.5 MW and a rotor blade length of 37 m, the length of the attached device is for example 5.5 m, in the case of a wind energy plant with an output of 2 MW and a rotor blade length of 45 m, the length of the attached device is for example 7 m and, in the case of a wind energy plant with an output of 5 MW and a rotor blade length of 61 m as well as a thin blade geometry, the length of the attached device is for example 15.5 m (with relatively thick profiles).

The cross-sectional form of the attached device 51 is thereby not decisive; the triangular form is particularly advantageous especially for structural reasons. In the case of known wind energy plants with already installed rotor blades, the attached device 51 is retrofittable, since in practice there is no increase in the system load compared to the high load assumptions of the design method.

This knowledge is based on the fact that the lift coefficients in the rotor blade inner area predicted with simple calculation methods and theoretically are not reached in reality. With the attached device according to the invention, the profile properties of a rotor blade are improved such that the original assumptions are also achieved in practice.

The geometry of an advantageous positioning of the attached device 51 is shown in FIG. 1 using as an example a rotor blade with a length of 37 m. The rotor plane 11 is also entered next to the designed-based directions of air inflow for a radius (from the rotor hub) of 2.8 m (profile 21), 4 m (profile 22), 5 m (profile 23), 6 m (profile 24) and 7 m (profile 25).

It should be noted that the position of the attached device 51 moves back away from the blade front edge with an increasing rotor radius. The absolute distance of the break-off point as reference point of the attached device 51 to the respective blade front edge increases. The only exception is the innermost profile section 21 with a radius of 2.8 m.

With respect to the rotor blade plane 11, the following angle positions of the attached device result, measured around the rotor blade longitudinal axis:

| Profile | Radius [m] | Relative Blade Length [%] | Angle Position Attached Device |
|---|---|---|---|
| 21 | 2.8 | 8 | 169° |
| 22 | 4 | 11 | 162° |
| 23 | 5 | 13.5 | 167° |
| 24 | 6 | 16 | 174° |
| 25 | 7 | 19 | 180° |

It can be seen that, for the inner profile as of a predetermined profile, the angle position of the attached device increases with an increasing rotor radius. In the transition from the innermost profile 21 (radius 2.8 m) to the next profile 22 (radius 4 m), the angle position of the attached device 51 decreases slightly.

Figure 2:
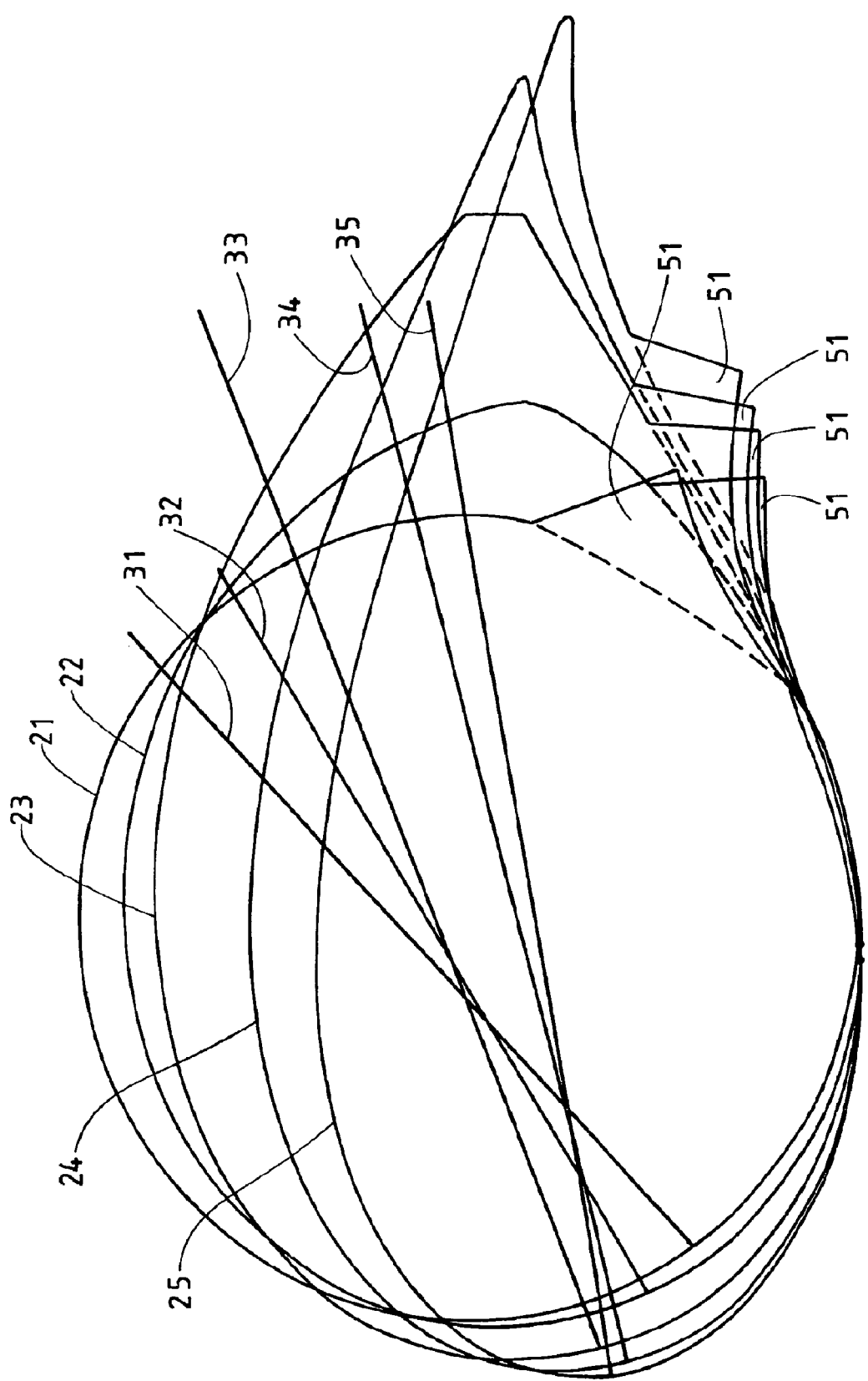
FIG. 2 shows overlapping profile sections of another rotor blade according to the invention.

FIG. 2 shows another preferred embodiment of a rotor blade, in which the profiles 21 through 25 are arranged asymmetrically on the blade length axis or string axis. The blade free wheel in front of a tower of a wind energy plant is hereby increased correspondingly. The corresponding designed-based directions of air inflow 31 through 35 are also drawn in for each of the associated profile sections 21 through 25.

The height of the attached device 51 in the exemplary embodiments in FIG. 1 and FIG. 2 in the circular cylinder area of the rotor blade is approx. 10% of the cylinder diameter, in the area of a profile thickness of 45%, approx. 8% of the profile thickness. The aerodynamic efficacy of the attached device 51 will increase as the height of the attached device 51 increases, wherein it should be noted for the embodiments that a good compromise for the construction effort is achieved for an additional attached device 51 and the additional load for a rotor blade and the thus achieved increase in yield.

It can be seen in the exemplary embodiments in FIGS. 1 and 2 that the attached device 51 in the inner area (profile 21) moves back to the back edge of the profile. Since the inflowing turns strongly in the inner area, the circular cylinder of the rotor blade with the attached device 51 also turns counter clockwise, whereby the position of the attached device 51 moves upwards. An overall bent or curved form of the attached device 51 results through this backing along the string axis of the rotor blade.

Alternatively, a preferred embodiment omits the backing of the attached device in the inner area. This is slightly worse in terms of energy yield, but enables a very simple, mainly straight geometry of the attached device and thus a simple construction.

Due to the fact that an attached-device inflow surface is present in the inner area of a rotor blade through the attached device 51, the efficiency of the rotor blade in the vicinity of the rotor blade connection increases in its energy yield. An energy-yield-optimized design of a rotor blade is hereby enabled. For example, the attached device 51 can be arranged in the form of a spoiler during the production of the rotor blades so that a complete change in the production process of a rotor blade does not need to be performed.

For example, glass fiber reinforced plastic (GRP) is a suitable material for the production of an attached device 51. In the break-off point, i.e. at the end point of the inflow surface or the attached-device inflow surface of the attached device 51, it is preferred that a sharp edge be designed as an end edge. On the inside in the area of the sharp end point of the attached device 51 in the area of the end edge, the corner is advantageously rounded for reasons of stability. This results in a very high stability of the attached device when the weight of the attached device is low.

It is thus advantageous when the attached device 51 is executed comparatively elastically in the direction of the blade length axis, i.e. that very high dilations lie in the tolerance range in the longitudinal direction.

In further embodiments, it is provided that the attached device is brought into a working position. The attached device is hereby actively designed in order to increase the energy yield at wind speeds below the nominal speed when the attached device 51 is switched on or in. In the case of high wind speeds, the load on the rotor blade is reduced through the folding in or retraction or switching off of the attached-device inflow surface or the attached device 51 in that the attached-device inflow surface lies close to the normal rotor blade profile.

An air sack on the inside of the device is especially suitable for switching the attached device on and in, whereby the inner volume of the attached device is decreased or increased so that different adjustment angles of the attached device 51 result with respect to the pressure side of the rotor blade. In particular, the attached device 51 is brought from an idle position into a working position through the air sack or another switchable device, wherein this operation is designed reversibly.

Figure 3:
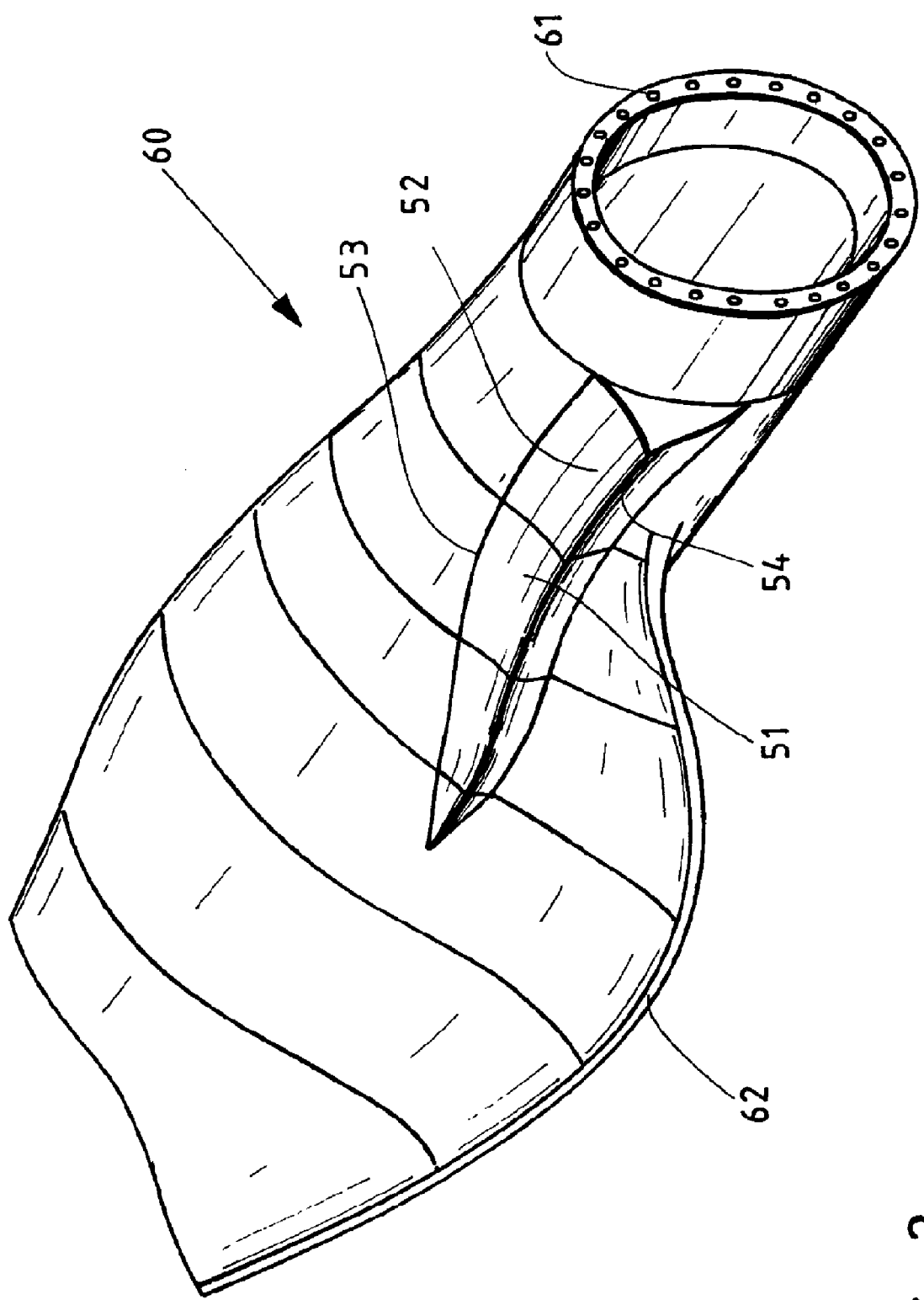
FIG. 3 shows a perspective view of a rotor blade in the inner area with an attached device according to the invention.

FIG. 3 also shows a perspective view of an inner area of a rotor blade 60 in a perspective view. The rotor blade 60 has a circular rotor blade connection 61. The attached-device body 51 is connected in the connection to the round circular cross-section of the rotor blade 60 in the area facing away from the front edge, which is arranged like a spoiler on the pressure side of the rotor blade 60.

The back edge 62 attaches above the rotor blade connection 61 on the back side of the rotor blade 60. The attached-device body 51 has an attached-device inflow surface 52, wherein the corresponding start points of the profiles lie in the transition from the normal flow area of the rotor blade 60 to the attached-device inflow surface 52. The drawn line 53 thus forms a type of connection line of the start points. The attached-device inflow surface 52 of the attached device 51 is defined by the connection line 54 of the attached-device inflow surface 52. The end points of the attached-device inflow surface 52 are located along the connection line 54.

FIGS. 4a through 4d show advantageous embodiments of an attached device 51 or modified profiles from FIG. 1. The drawn profiles 21, 22, 23, 25 thereby correspond to the profile sections shown in FIG. 1. In this embodiment, the modified profile sections 21, 22, 23, 25 have a very high aerodynamic quality so that the energy yield of a rotor blade in the area near the inner rotor hub will be or is maximized. An optimized attached device 151 (in comparison to the other attached device 51) (see FIG. 1 or FIG. 2) hereby results with respect to the achievable additional energy yield.

Figure 4A:
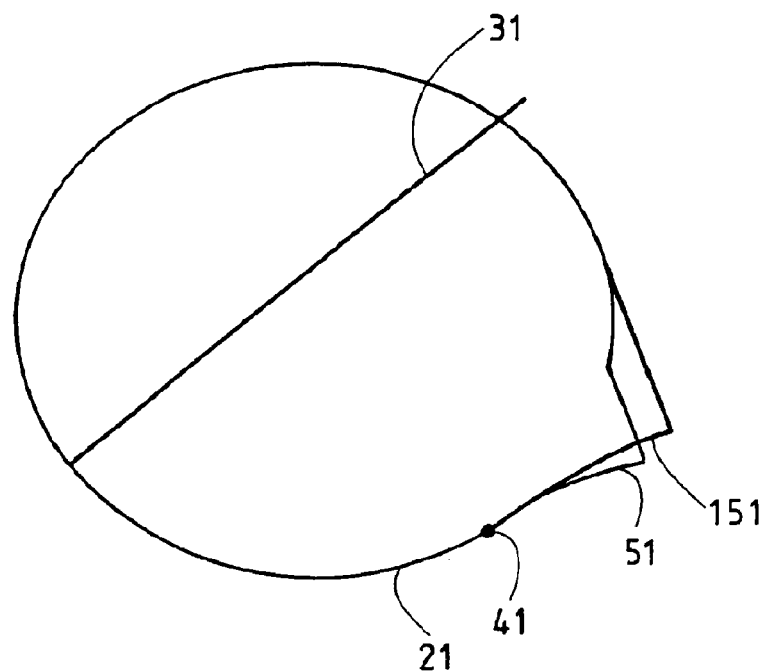
Figure 4B:
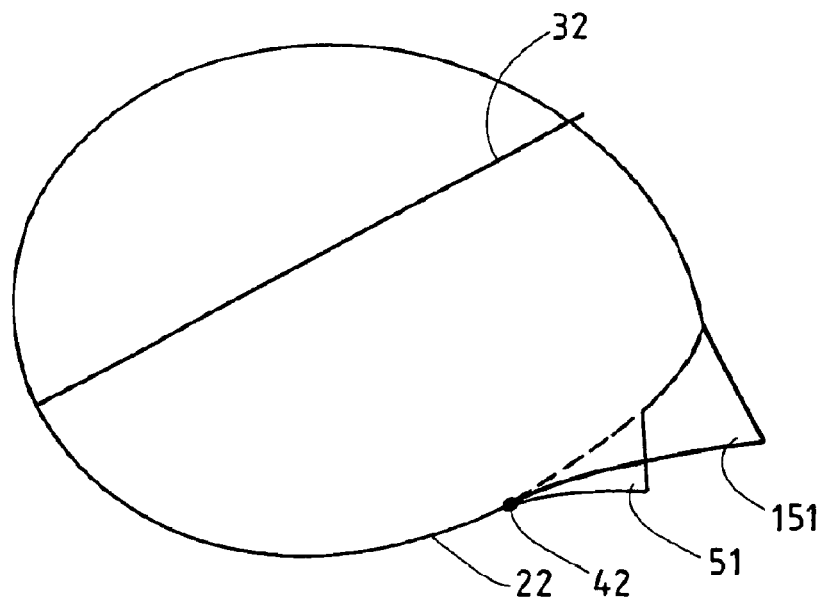
Figure 4C:
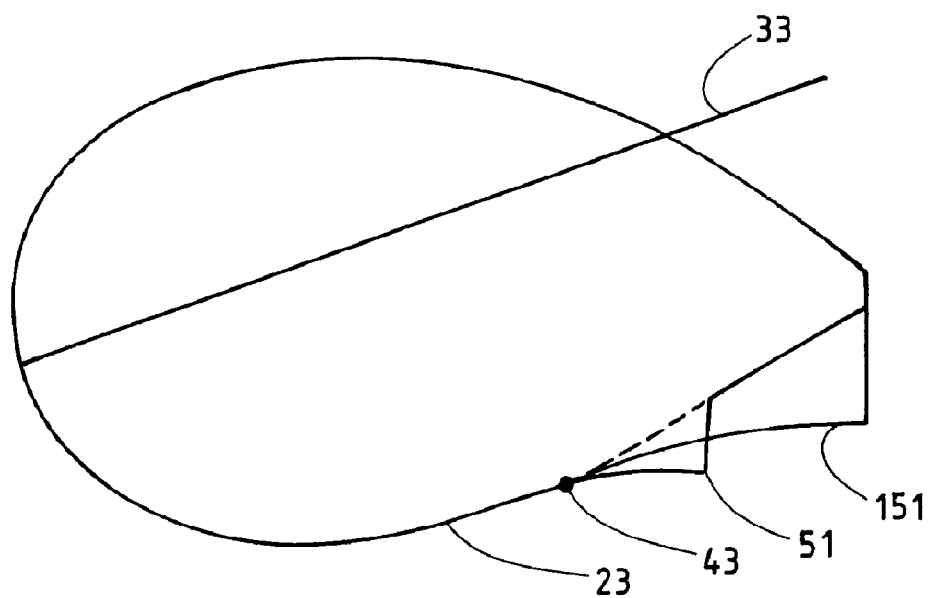

The position of the start points of the individual profile sections 21, 22, 24, 25 and the local air inflow direction 31, 32, 33 and 35 are easy to detect in FIGS. 4a through 4d. FIG. 4a through 4c show very clearly that the profile contour in the thick profiles in the area of the start point 41, 42, 43 are mainly parallel to the air inflow direction.

Figure 4D:
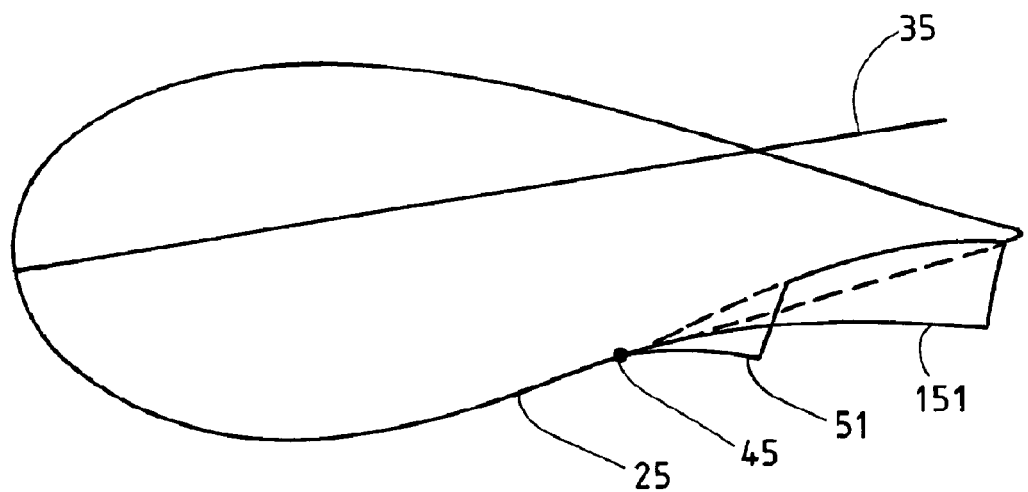

Only the outermost lying profile section 25 in FIG. 4d shows an already somewhat larger deviation of the profile contour in the start point 45 from the air inflow direction (approx. 12°). The already somewhat thinner profile lying in the outer area of the attached device 151 makes it possible for the flow to already tolerate a small pressure increase through a backing profile contour. The start point 45 of the attached device 151 is hereby positioned right in front of the potential break-off point, wherein the profile contour is pulled outside by the attached device 151, so that the flow first breaks off considerably further behind at the break-off point of the attached device 151.

The energy-yield-optimized design of the attached device 151 has an even stronger shift of the break-off point away from the blade front edge than the geometry of the design shown in FIGS. 1 and 2. However, the construction effort for this type of attached device is high.

This type of attached device makes sense especially when rotor blades need to be improved right away during production, wherein a completely new rotor blade form does not need to be built. The shown attached device can easily be mounted on an existing rotor blade.

FIG. 5 shows the design of an attached device 51 with adhesive flaps 71, 72 in cross-section on a profile. Adhesive flaps 71, 72 with a width of 50 to 80 mm prove to be advantageous in the case of a rotor blade with a length of 37 m and a length of the attached device of approx. 5.5 m. The attached device 51 itself is made of 2- to 4-mm-thick GRP (laminated tissue or fiber spray). The break-off point is designed to achieve a high aerodynamic quality as the sharpest possible corner.

The unavoidable contour jump for a glued attached device 51 or glued spoiler in the start point 45 should be kept as small as possible, maximum 5 mm, in particular 2 to 3 mm. In order to regulate resistance, a rounding off with an adhesive substance (e.g. Sikaflex) is advantageous.

In the inner contour, this corner is advantageously slightly rounded off for reasons of stability. A very high stability at a low weight is achieved for the glued attached device 51 through the triangular cross-section.

| List of References | |
|---|---|
| 11 | Rotor plane |
| 21 | Profile |
| 22 | Profile |
| 23 | Profile |
| 24 | Profile |
| 25 | Profile |
| 31 | Designed-based direction of air inflow |
| 32 | Designed-based direction of air inflow |
| 33 | Designed-based direction of air inflow |
| 41 | Start point |
| 42 | Start point |
| 43 | Start point |
| 51 | Attached device |
| 52 | Attached-device inflow surface |
| 53 | Line |
| 54 | Connection line |
| 60 | Rotor blade |
| 61 | Rotor blade connection |
| 62 | Back edge |
| 71 | Adhesive flap |
| 72 | Adhesive flap |
| 151 | Attached device |

The invention claimed is:

1. Rotor blade (60) of a wind energy plant with a top side (suction side) and a bottom side (pressure side), comprising:
profiles (21, 22, 23, 24, 25) with a front edge and a back edge (62) in cross-section designed along a longitudinal axis between a rotor blade root and a rotor blade tip, wherein one designed-based direction of air inflow (31, 32, 33, 34, 35) is predetermined for each profile (21, 22, 23, 24, 25) and the profiles in an outer area facing the rotor blade tip are designed with a relative thickness of less than 30%, wherein an attached device (51), which has an attached-device inflow surface (52) and a start point (41, 42, 43) facing the front edge of the attached-device inflow surface (52) and an end point facing the back edge (62), is arranged along the longitudinal axis in an inner area assigned to the rotor blade root to profiles (21, 22, 23) with a relative thickness of more than 30% on the pressure side, wherein the start point (41, 42, 43) of the attached-device inflow surface (52) is arranged in an area between the front edge and the back edge (62) of the profiles (21, 22, 23, 24, 25) so that a tangent to the profile (21, 22, 23, 24, 25) in the start point (41, 42, 43) is designed in an angle area between +20° and −20° for the designed-based direction of air inflow (31, 32, 33, 34, 35) of the profile (21, 22, 23, 24, 25) and wherein the end point of the attached-device inflow surface (52) ends in front of the back edge (62).

2. Rotor blade (60) according to claim 1 wherein an attached device (51), which has an attached-device inflow surface (52) and a start point facing the front edge of the attached-device inflow surface (52) and an end point facing the back edge (62), is arranged along the longitudinal axis in the inner area assigned to the rotor blade root to profiles (21, 22, 23, 24, 25) with a relative thickness of more than 30% on the pressure side, wherein the start point of the attached device inflow surface (52) is designed in front of a break-off point of a medium flowing over the rotor blade (60) on the pressure side.

3. Rotor blade (60) according to claim 1, wherein the tangent in the start point (41, 42, 43) is designed mainly parallel to a designed-based direction of air inflow (31, 32, 33, 34, 35).

4. Rotor blade (60) according to claim 1, wherein start points (53) of the attached-device in-flow surface (52) are connected continuously from inside to outside.

5. Rotor blade (60) according to claim 1, wherein end points (54) of the attached-device inflow surface (52) are connected continuously from inside to outside.

6. Rotor blade (60) according to claim 1, wherein a separation distance of end points (54) of the attached-device inflow surface (52) increases from the front edge of the rotor blade (60) along the longitudinal axis from in-side to outside.

7. Rotor blade (60) according to claim 1, wherein the attached device (51) is designed as a spoiler (51).

8. Rotor blade (60) according to claim 1, wherein the attached device (51) will be or is glued to the rotor blade (60).

9. Rotor blade (60) according to claim 1, wherein the attached device (51) is retrofittable or retrofitted.

10. Rotor blade (60) according to claim 1, wherein the attached device (51) will be or is brought from an idle position to a working position.

11. Rotor blade (60) according to claim 1, wherein the end point of the attached-device inflow surface (52) is designed as a flow break-off point.

12. Wind energy plant with at least one rotor blade (60) according to claim 1.

13. Use of an attached device (51), which will be or is arranged in an inner area of a rotor blade (60) according to claim 1.

14. Method for the production of a rotor blade (60) of a wind energy plant, wherein an attached device (51) is arranged in the inner area of the rotor blade (60) so that the rotor blade (60) is designed according to claim 1.

* * * * *